United States Patent [19]

Winecoff

[11] 4,417,492

[45] Nov. 29, 1983

[54] APPARATUS FOR CUTTING USED TIRES

[76] Inventor: John E. Winecoff, Rte. 1, Box 861, Rockwell, N.C. 28138

[21] Appl. No.: 300,009

[22] Filed: Sep. 8, 1981

[51] Int. Cl.[3] .............................................. B23B 5/14

[52] U.S. Cl. .......................................... 82/46; 157/13

[58] Field of Search ................ 157/13, 1.2, 1.21, 1.26, 157/1.28; 82/82, 86, 91, 101, 78, 46 R

[56] References Cited

U.S. PATENT DOCUMENTS

| | | | |
|---|---|---|---|
| 1,702,113 | 2/1929 | Gandee | 157/13 |
| 3,080,899 | 3/1963 | Robertson | 157/13 |
| 3,136,352 | 6/1964 | Pettit | 157/13 |
| 3,478,804 | 11/1969 | Meixner | 157/13 |
| 3,733,941 | 5/1973 | Geyer | 157/13 |

*Primary Examiner*—Leonidas Vlachos
*Assistant Examiner*—Jerry Kearns
*Attorney, Agent, or Firm*—Roy B. Moffitt

[57] ABSTRACT

An apparatus for cutting tires is disclosed that employs: a base on which there is disposed two upstanding shafts (one rotatable), and first and second plates to sandwich therebetween the tire casing. Both plates have upstanding teeth members, an off-center hole and a center hole. The rotatable shaft is disposed in the center hole of both plates and the other shaft is disposed in the off-center hole of the first plate. On the same side of the first plate on which the upstanding teeth means are disposed, there is affixed an upstanding member which is received in the off-center hole of the second plate. A cutter bar is provided that has a cutting means and a rotatable handle on one terminal portion. The cutting bar also has a handle and it contains an elongated rectangular shaped slot. The terminal portion of the rotatable shaft is rectalinear in cross section and is disposed in the cutter bar slot so that upon rotation of the shaft, the cutter bar also rotates.

6 Claims, 11 Drawing Figures

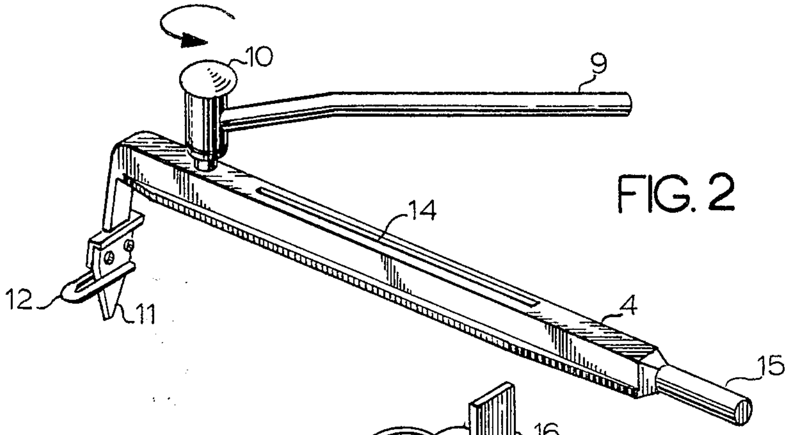
FIG. 2
FIG. 3
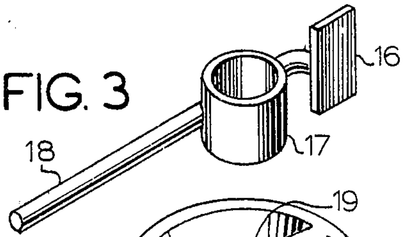
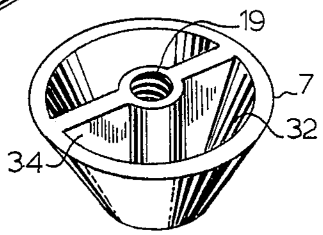
FIG. 4
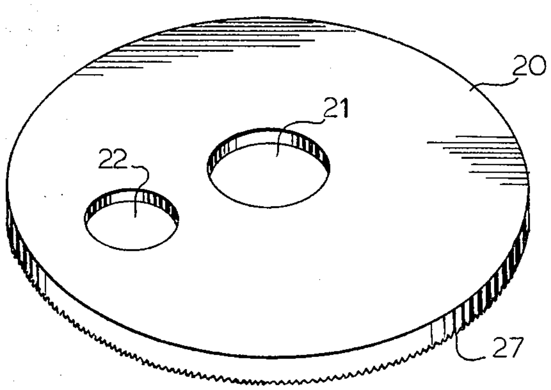
FIG. 5
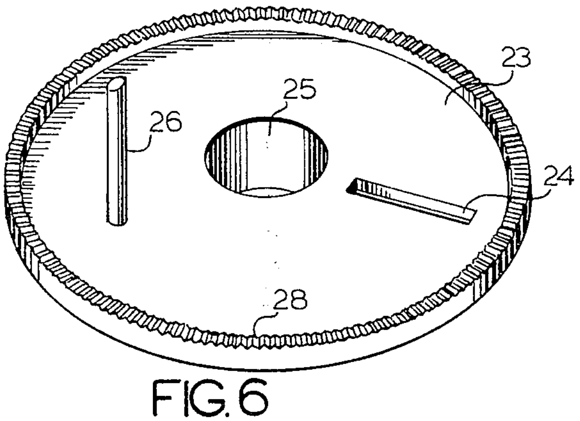
FIG. 6
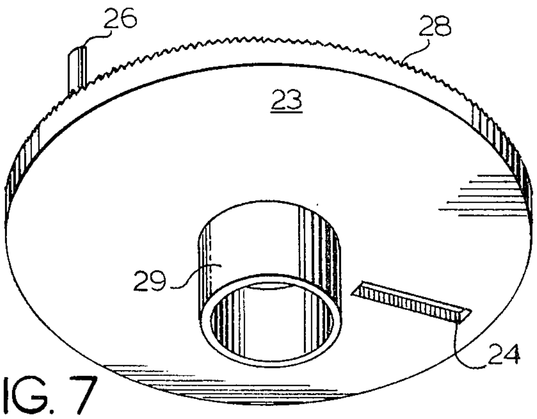
FIG. 7

APPARATUS FOR CUTTING USED TIRES

BACKGROUND OF THE INVENTION

Many products flowing from the world's industrialized society cannot just be thrown away, without treatment or modification, after their usefulness has expired. Rules and ordinances related to the operation of sanitary landfills and other waste disposal plants forbid the acceptance of a tire casing per se because of its bulk, shape and propensity to collect water and thus provide a place for breeding mosquitoes and other harmful insects. Some landfill operations, however, do accept unprepared tire casings, but at a premium price. Most, if not all, landfill operations accept tire casings if the tire side walls were separated from the tread portion. To accomplish this, a machine is needed that will cut the side walls or it must be done by hand.

U.S. Pat. No. 3,733,941 addresses the problem of providing an apparatus for removing the side walls of the tire from the tread portion. This disclosure is directed to a machine that includes a rather complicated means for grasping a tire from within the tire itself plus a cutting bar rotated by an upstanding rotating shaft to which the cutter bar is attached. This particular disclosure can be interpreted as a distinct machine adapted to perform and dedicated to the sole function of cutting tires.

Applicant's invention, on the other hand, provides for a means to grasp the tire to be cut not from within but from without, i.e., on the outside of the side walls themselves and further provides a cutter bar and first and second plates to accomplish such grasping. These plates can be easily assembled and removed from existing, on the market, tire changers, e.g., a Coats 20-20 Superstar, available on the commercial market through various distributors. Thus, the instant invention, does not require a machine that is solely dedicated to removing tire side walls from the tread portion as is the case with prior art apparatus. Removal of the cutter bar and plates prepares the proposed apparatus for the function of tire changer.

SUMMARY OF THE INVENTION

The invention can be briefly described as a base having two upstanding shaft members, one rotatable and one nonrotatable, the rotatable shaft having a free terminal portion of a rectalinear cross section. A portion of the rotatable shaft is coaxially nested inside of a nonrotatable threaded sleeve member to which a nut member may be affixed. First and second plate members are provided, both having a center hole and off-center hole in addition to an upstanding teeth members around the plate's periphery. The function of the teeth members is to dig into the tire side walls and grasp it. The first plate has an upstanding member on the same side as the teeth and is assembled into the contemplated apparatus by fitting the rotatable shaft member-sleeve combination through the center hole and the nonrotatable shaft member through the off-center hole. This prevents rotation of the first plate member. The tire casing is placed on top of the first plate member so that its side walls are in engagement with its upstanding teeth. The second plate, teeth oriented downwardly, is placed on the opposite side wall of the tire, the rotatable shaft member fitted in the center hole and the upstanding shaft member of the first plate fitted in the off-center hole of the second plate. Such a sandwich interlocking composite of first plate, tire and second plate cannot be rotated so long as the teeth members are snuggly fitted against the side walls of the tire. To accomplish this, a threaded nut means is then screwed onto the nonrotatable sleeve member and rotated until the sandwich parts are snuggly fastened to each other.

A cutter bar is provided comprising an elongated handle at one end of which is a knife disposed perpendicular to the cutter bar handle. The handle has an elongated slot running longitudinally the major portion of its length adapted to snuggly receive the rectangular terminal portion of the rotatable shaft. When the shaft is rotated, the snuggly fitted relationship between the slot and the rectangular terminal portion causes the cutting means to rotate. On the same terminal portion of the cutting means where the knife is located, there is an additional handle rotatably fixed to the cutter bar on the side opposite from the knife. This last-mentioned handle is used as a lever to provide means to multiply the force necessary to puncture the tire side wall with the knife in preparation for rotating the handle and the knife.

BRIEF DESCRIPTION OF THE DRAWINGS

FIG. 2 is an isometric view of a cutter bar used with the invention;

FIG. 3 is an isometric view of a tool used in assembling the invention;

FIG. 4 is an isometric view of a bolt means used in the assembly of the invention;

FIG. 5 is an isometric view of an upper plate used to grasp the side walls of a tire;

FIG. 6 is an isometric view of the top portion of a bottom plate used to grasp the side walls of a tire;

FIG. 7 is an isometric view of the bottom portion of the plate of FIG. 6;

DETAILED DESCRIPTION OF THE DRAWINGS

Figure 1:
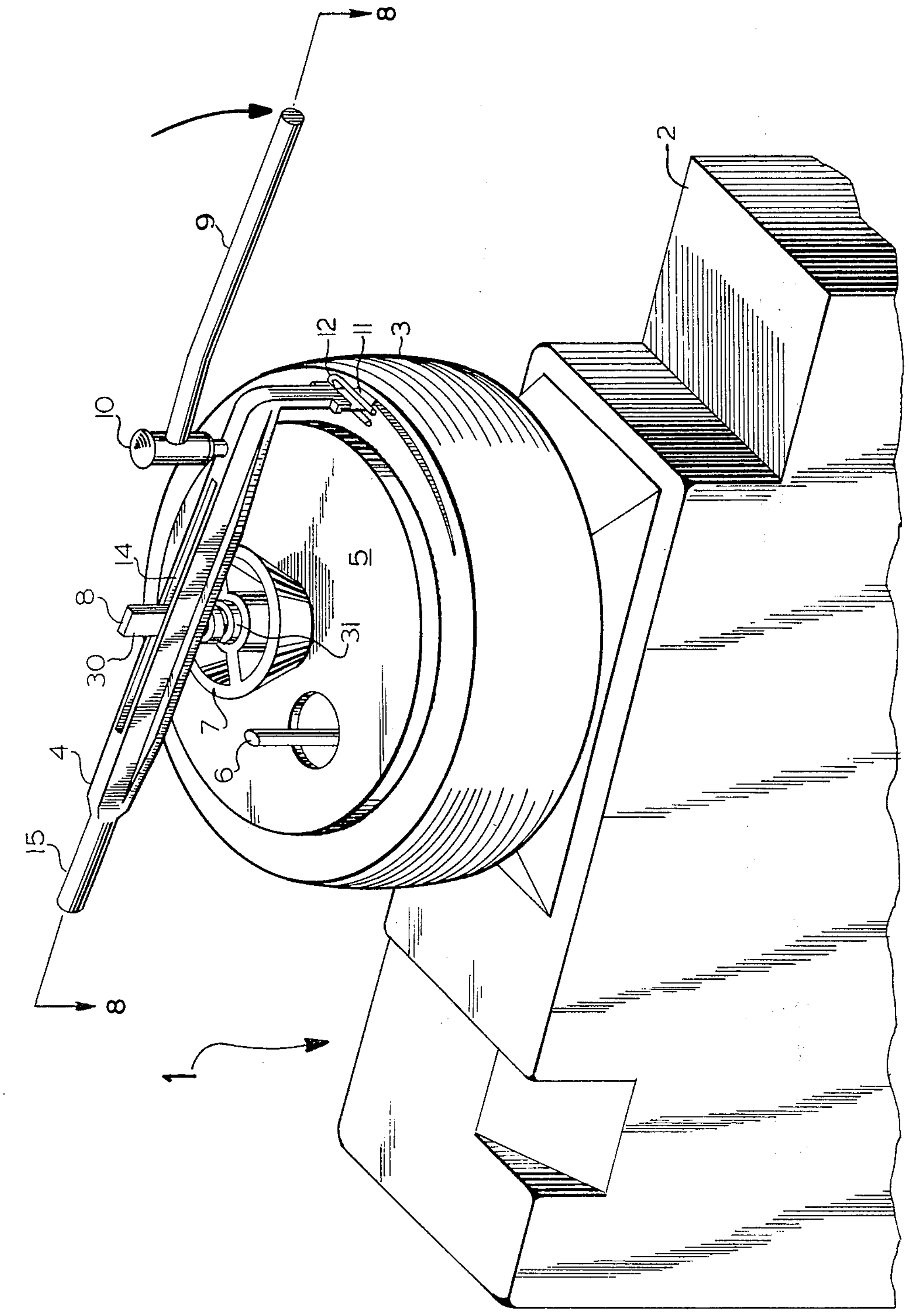
FIG. 1 is an isometric view of the apparatus of this invention.
Figure 8:
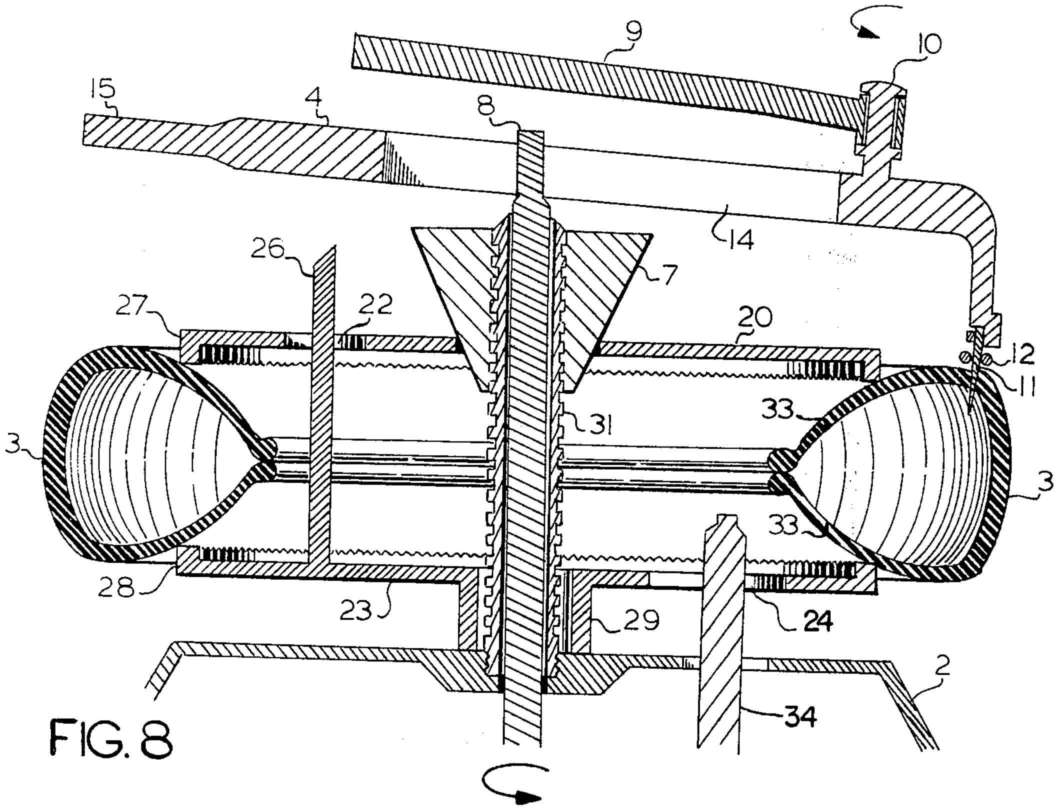
FIG. 8 is a cross section view of the invention along the lines 8—8 of FIG. 1.

Referring to FIGS. 1 and 8, element 1 refers to the overall apparatus used for cutting side walls 33 of tires 3 from their tread portion. Element 2 is a base of a conventional, commercially available tire changing apparatus that has two upstanding members, one indicated by element 29 (nonrotatable) and the other shown as element 8 (rotatable) nested axially inside of nonrotatable threaded sleeve member 31. Positioned upon base 2 is a first plate 23, shown separately in FIG. 6. First plate 23 contains upstanding teeth members 28 disposed on its periphery, an upstanding shaft member 26, center hole 25, and off-center hole or slot 24. On its bottom side (FIG. 7) first plate 23 has affixed to it sleeve member 29, which in its assembled state (FIG. 8) is oriented in a downward position and fitted around rotatable shaft 8 with nonrotatable upstanding shaft 34 fitted inside of off-center slot 24. Assembling first plate 23 in this manner interlocks this plate with the base by means of slot 24 and upstanding shaft 34 relationship. This orientation of first plate 23 results in the upstanding orientation of teeth members 28. On such teeth members, tire 3 with its side walls 33 is positioned. It will be noted that side walls 33 of the tire are in engagement with the teeth members 28 and are obviously grasped thereby.

On top of tire 3 is positioned second plate 20 which, like first plate 23, has a center hole 21 and an off-center hole 22. The shape of hole 22 and slot 24 are arbitrary and amount to one of design as far as this invention is concerned. Plate 20 also has upstanding teeth members disposed around its periphery shown as element 27. This plate is then placed on top of tire 3 and side walls 33 so that teeth members 27 are oriented downwardly, i.e., engage side walls 33. Rotatable member 8 and sleeve member 31 are slidably engaged inside of center hole 21 and upstanding shaft member 26 of the first plate is disposed inside of off-center hole 22, thereby interlocking, with respect to rotational movement in the horizontal plane, first plate 23, tire 3 and second plate 20.

FIG. 4 shows a nut means 7, which is threaded onto nonrotatable threaded sleeve 31 in which rotatable shaft 8 is nested. Nut means 7 has two cavities 32 separated by wall 34 and a threaded center post 19. It may be threaded onto threaded sleeve member 31 by means of a tool shown in FIG. 3, which is composed of a handle 18 affixed to a positioning means 7, which is basically a short length of pipe, and a blocking means 16. Positioning means 17 is fitted over rotatable shaft 8 with the blocking means 16 fitted in one of the cavities 32 and positioned against wall 34 and then rotated, thereby tightening nut 7 snuggly against plate 20 and on sleeve 31, forming a "sandwich" of plate 23, tire 3 and plate 20.

Shown in FIG. 2 is a cutter bar, which is removably affixed to the upper rectangular portion 30 of rotatable shaft 8. As shown in FIG. 1, the upper portion 30 of rotatable shaft 8 is rectangular in cross section. Cutter bar 4 of FIG. 2 has a handle composed of handle portion 15 in which there is a slot 14 extending the majority of its longitudinal length. Affixed to one terminal portion of handle 15 is a second handle means 9, which is rotatably affixed thereto by means of rotatable element 10. To the same terminal portion that handle means 9 is affixed to handle 15 and on the opposite side thereof there is affixed a knife means 11, which contains a depth gauge 12. The depth gauge 12 is used to optimumly position knife 11 in the vertical position by providing its some support—it rests on side wall 33—during the cutting of the side wall. Cutter bar means 4 is positioned on rotatable shaft 8 by slidably engaging the rectangular portion 30 of rotatable shaft 8 in slot 14.

In operation, the invention is assembled as shown in FIGS. 1 and 8 and the cutter bar is positioned so that knife 11 is ready to puncture side walls 33 of tire 3. Handle 9 is then swung to the position shown in FIG. 1 and a downward force is applied thereto, such leverage being sufficient to cause the knife 11 to puncture the side wall 33 of tire 3. Rotatable shaft 8 is then activated, and the nature of the engagement of terminal portion 30 of rotatable shaft 8 slidably fitted into slot 14 rotates the cutter bar in the desired circular path, thereby cutting the side walls 33 of the tire and severing it from tread 3.

Figure 9:
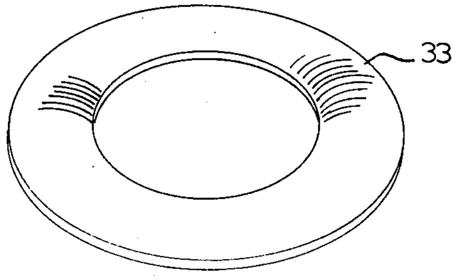
FIGS. 9 and 11 are isometric views of a severed tire side wall.
Figure 10:
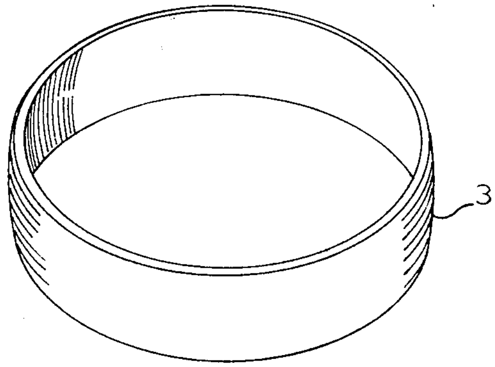
FIG. 10 is an isometric view of the tread of a tire severed from its side walls.
Figure 11:
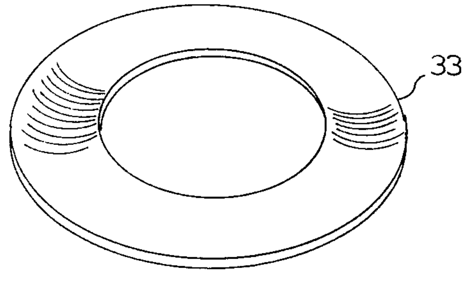

The uppermost side wall 33 obviously is done first, then the lower side wall is severed from the tread in a like manner. See FIGS. 9 and 11. This results in a tread portion 3 as depicted in FIG. 10 as the remainder. Side walls 33 of FIGS. 9 and 11 and tread 3 of FIG. 10 are then in such a state that sanitary landfills will receive them without a premium.

During rotation of cutter bar 4, handle 9 may be used in its extended position as shown by FIG. 1 and/or in its closed position, as shown by FIG. 8, the extended position is shown by FIG. 1 permitting leverage to be applied to the knife 11 to keep it firmly and consistently engaged while handle 4 is being rotated throughout the desired circular path.

Various changes can be made in location, size and configuration of the components of the apparatus disclosed by this invention without departing from the spirit of this invention and the scope of the following claims.

What is claimed is:

1. An apparatus for cutting tire casing having sidewalls and a tread portion comprising:
(a) a base member;
(b) first and second upstanding shafts supported by and connected to said base and means for rotatably supporting said first shaft;
(c) first and second plates, each having a center hole through which said first shaft is disposed and upstanding teeth for grasping the tire casing sidewalls, said first plate having an off-center hole therein in which said second shaft is received and thereby interlocked therewith and an upstanding member affixed thereto on the same side the teeth are so affixed; and,
(d) a cutter bar and a means thereon for affixing same to said first shaft.

2. An apparatus as described in claim 1 wherein said first shaft has a rectangular shaped terminal portion and said cutter bar comprises an elongated member, a knife and a means for affixing said knife to said elongated member.

3. An apparatus as described in claim 2 wherein said means in said cutter bar for affixing the cutter bar to said first shaft is an elongated slot into which a terminal portion of said rotatable shaft is slideably engaged to co-act with the sidewalls of said slot so that upon rotation of said shaft the cutter bar also rotates.

4. The apparatus as described in claim 1 containing a nut means and a threaded non-rotatable sleeve member, supported by said base, in which said first shaft is axially nested, wherein the nut means is adapted to be threadably engaged to said non-rotatable sleeve member and in engagement with said second plate.

5. An apparatus as described in claim 1 wherein said second plate has an off-center hole therein in which the upstanding member of said first plate is received thereby interlocking said second with said first plate.

6. An apparatus as described in claim 1 containing a handle means and a means to rotatably affix same to said cutter bar.

* * * * *